United States Patent
Batchu et al.

(10) Patent No.: US 10,021,101 B2
(45) Date of Patent: *Jul. 10, 2018

(54) EMBEDDING SECURITY POSTURE IN NETWORK TRAFFIC

(71) Applicant: MOBILE IRON, INC., Mountain View, CA (US)

(72) Inventors: Suresh Kumar Batchu, Milpitas, CA (US); Mansu Kim, San Jose, CA (US)

(73) Assignee: MOBILE IRON, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/663,445

(22) Filed: Jul. 28, 2017

(65) Prior Publication Data
US 2017/0331823 A1    Nov. 16, 2017

Related U.S. Application Data

(63) Continuation of application No. 14/517,723, filed on Oct. 17, 2014, now Pat. No. 9,756,047.

(60) Provisional application No. 61/892,363, filed on Oct. 17, 2013.

(51) Int. Cl.

| | |
|---|---|
| *G06F 21/44* | (2013.01) |
| *H04W 12/08* | (2009.01) |
| *H04L 29/06* | (2006.01) |
| *H04W 12/10* | (2009.01) |
| *G06F 21/57* | (2013.01) |

(52) U.S. Cl.
CPC .......... *H04L 63/0876* (2013.01); *G06F 21/44* (2013.01); *G06F 21/57* (2013.01); *G06F 21/577* (2013.01); *H04L 63/102* (2013.01); *H04W 12/08* (2013.01); *H04W 12/10* (2013.01)

(58) Field of Classification Search
CPC ........ G06F 21/44; G06F 21/57; G06F 21/577; H04L 63/0876; H04L 63/102; H04W 12/08; H04W 12/10
See application file for complete search history.

(56) References Cited

U.S. PATENT DOCUMENTS

| | | | |
|---|---|---|---|
| 8,117,344 B2 | 2/2012 | Mendez | |
| 8,713,646 B2 | 4/2014 | Stuntebeck | |
| 9,436,820 B1* | 9/2016 | Gleichauf | ............... G06F 21/50 |
| 2004/0030764 A1* | 2/2004 | Birk | .................... H04L 61/1523 709/223 |
| 2007/0240197 A1* | 10/2007 | Blumenthal | ........ H04L 63/0227 726/1 |
| 2010/0100939 A1* | 4/2010 | Mahaffey | ................ G06F 21/30 726/4 |
| 2011/0167470 A1* | 7/2011 | Walker | .................... H04L 63/20 726/1 |
| 2012/0054847 A1 | 3/2012 | Schultz | |
| 2012/0297456 A1* | 11/2012 | Rose | ........................ G06F 21/74 726/4 |

(Continued)

*Primary Examiner* — Theodore C Parsons
(74) *Attorney, Agent, or Firm* — Van Pelt, Yi & James LLP

(57) ABSTRACT

Embedding security posture in network traffic is disclosed. Security posture information is received. The security posture information is embedded into a message. The message including the security posture information is sent from a mobile device to a service node. The service node uses the security posture information to validate the mobile device to access a service. The service accesses the service based at least in part on the validation.

26 Claims, 12 Drawing Sheets

(56) References Cited

U.S. PATENT DOCUMENTS

| | | |
|---|---|---|
| 2013/0263212 A1 * | 10/2013 | Faltyn .................. H04W 12/08 |
| | | 726/1 |
| 2014/0066015 A1 | 3/2014 | Aissi |
| 2014/0201816 A1 | 7/2014 | Brannon |
| 2014/0281539 A1 | 9/2014 | Faltyn |
| 2016/0088017 A1 | 3/2016 | Green |
| 2016/0099969 A1 | 4/2016 | Angus |

* cited by examiner

US 10,021,101 B2

EMBEDDING SECURITY POSTURE IN NETWORK TRAFFIC

CROSS REFERENCE TO OTHER APPLICATIONS

This application is a continuation of co-pending U.S. patent application Ser. No. 14/517,723, entitled EMBEDDING SECURITY POSTURE IN NETWORK TRAFFIC, filed Oct. 17, 2014, which claims priority to U.S. Provisional Patent Application No. 61/892,363, entitled SECURITY POSTURE EMBEDDED IN TRAFFIC FOR NETWORK APPLICATIONS, filed Oct. 17, 2013, both of which are incorporated herein by reference for all purposes.

BACKGROUND OF THE INVENTION

A service node may validate a mobile device to communicate with a service. A service node may include an inline security node such as a reverse proxy, firewall, router, virtual private network node, Wi-Fi controller, and/or other node. The service node may be associated with one or more services such as enterprise email, enterprise storage, a Wi-Fi network, a virtual private network, an enterprise intranet, and/or other services/resources. The service node may be configured to validate a mobile device for access to service(s) based on the security posture associated with the device. Typically, the service node retrieves mobile device security posture information from a device management server. Retrieving security posture information from the device management server may, however, result in increased load on the device management server and/or result in service delay while the service node queries the device management server. It would be useful if techniques could be developed to increase the efficiency of mobile device security validation at a service node.

BRIEF DESCRIPTION OF THE DRAWINGS

Various embodiments of the invention are disclosed in the following detailed description and the accompanying drawings.

DETAILED DESCRIPTION

Figure 1A:
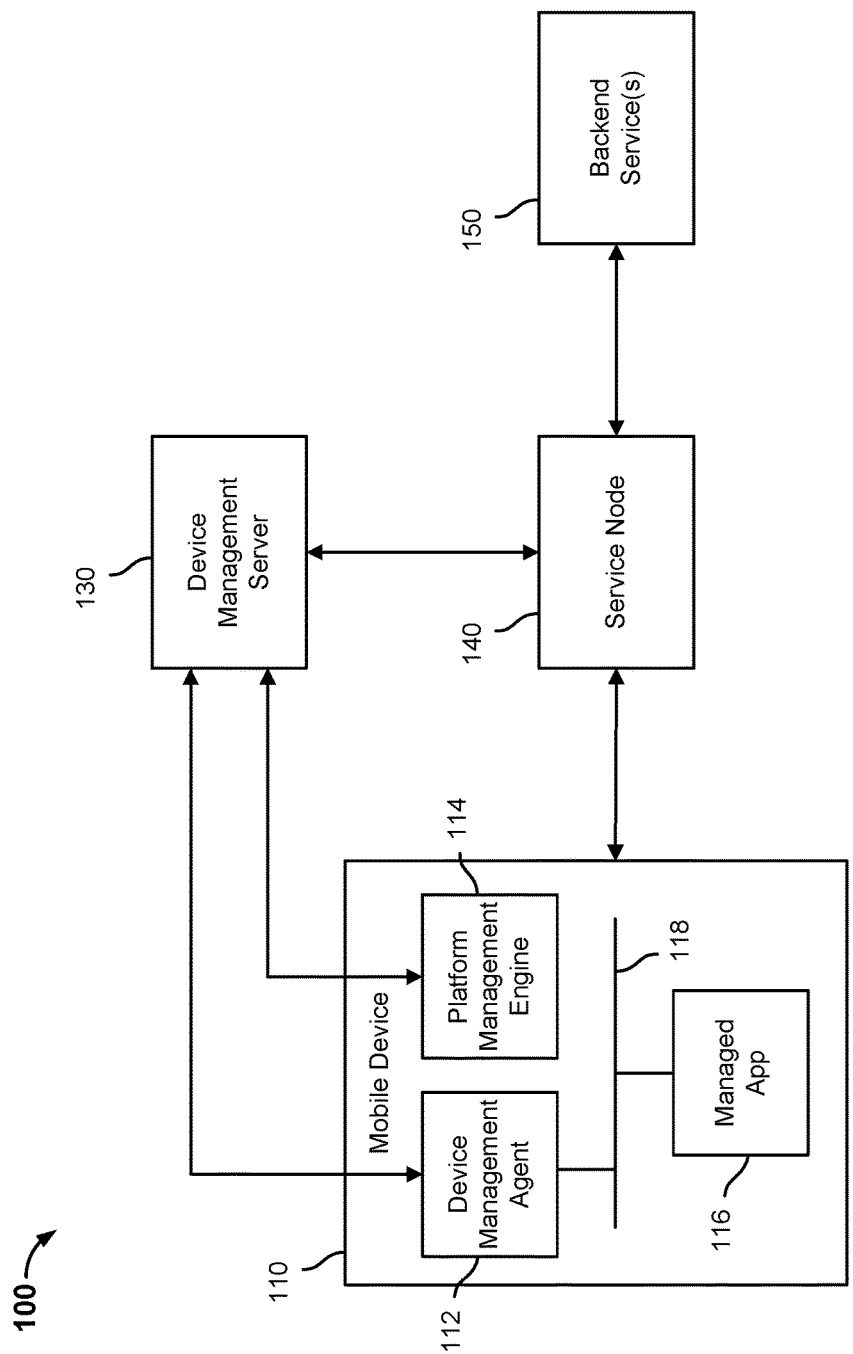
FIG. 1A is a block diagram illustrating embodiments of a system to embed security posture information into network traffic.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embedding security posture in network traffic is disclosed. In various embodiments, security posture information is generated at a device management server, an application on a mobile device, and/or other node. The security posture information may include, for example, a service identifier, a security posture value, posture expiration time, and/or other information. The security posture information may, in some cases, be encrypted and/or otherwise secured using, for example, an encryption key associated with a service node. The security posture information is provided to a mobile device and/or application on a mobile device. The mobile device and/or component thereof (e.g., an application on the mobile device) includes the security posture information in messages sent to a service node associated with a service that the mobile device seeks to access. The service node extracts the security posture information from the message. The service node analyzes the security posture information to determine whether to allow the mobile device to access the service, deny the mobile device access to the service, and/or perform other operations. Because security posture information is embedded in a message sent from the mobile device to the service node, the service node may not need to communicate with the mobile device management server to determine the security posture of the device. Reducing communications between the service node and the device management server may increase network access speeds, reduce service delay, reduce load on the device management server, and/or result in other benefits.

In various embodiments, security posture information is received. The security posture information is embedded into a message. The message including the security posture information is sent from a mobile device to a service node. The service node uses the security posture information to validate the mobile device to access a service. The mobile device accesses the service based at least in part on the validation.

FIG. 1A is a block diagram illustrating embodiments of a system to embed security posture information into network traffic. In the example shown, a system 100 includes a mobile device 110, device management server(s) 130, service node(s) 140, backend service(s) 150, and/or other components. The mobile device 110 may include a smartphone, tablet, and/or any other type of mobile device. The mobile device 110 may include components such as a management agent 112, a platform management engine 114 (e.g., an OS-related management engine), one or more managed applications 116, and/or other components. The management agent 112 includes a management agent installed on the device 110 by a mobile device management provider (e.g., separate from the mobile device operating system and/or mobile device developer). The platform management engine 114 includes a management agent/engine associated with the operating system (OS) of the device 110. In certain cases, the managed applications 116 are managed by the device management agent 112 and/or platform management engine 114. Managed applications 116 may include and/or be modified to include a library and/or wrapper. The library may be, for example, compiled into the application, injected into the application, added to the application by wrapping, added as a software development kit (SDK), and/or otherwise added to a managed application 116. The library and/or wrapper configure the managed application 116 for use in a mobile device management (MDM) environment by, for example, allowing the device management agent 112 to control the managed application 116 and/or perform actions on behalf of the managed application 116. In certain cases, the device management agent 112 provides information to and/or receives information from the managed applications 116 via a secure application communication bus 118.

In some embodiments, the mobile device 110 and/or components thereof (e.g., managed applications 116) establish a secure connection to backend services 150 via a service node 140. The service node 140 may include, for example, a proxy server, reverse proxy server, a gateway server, an access point, Wi-Fi access point, virtual private network (VPN) server, router, and/or any other type of node. The service node 140 controls access to the backend service (s) 150 by verifying the security posture of the mobile device 110, and establishing a secure communication session and/or tunnel between the mobile device 110 and the backend service 140. The backend service(s) 150 may include, for example, email services (e.g., Microsoft Exchange™), enterprise content management services (e.g., Microsoft Sharepoint™) a virtual private network (VPN), a Wi-Fi network, enterprise servers, enterprise network resources, and/or other services/resources.

In some embodiments, the service node 140 registers with the device management server 130 so that security posture information can be sent from the management server 130 to the mobile device 110 for inclusion in messages to the service node 140. In certain cases, the service node 140 and device management server 130 negotiate various parameters including a service identifier (service ID) for the service, encryption information for the service (e.g., public-private keys, a shared secret, etc.), protocol types, postures and associated posture values, posture expiration period information, and/or other information. The parameters are used by the device management server 130 to generate security posture information. The parameters are also used by the service node 140 to extract, decipher, and/or analyze the security posture information.

In various embodiments, the device management agent 112, platform management engine 114, and/or other components of the mobile device send state information to the device management server 130. The state information may be sent, for example, periodically, in response to a request, and/or at any other time. The state information may include a device state (e.g., secure, unsecure, unsecure-jailbroken, etc.), application inventory information (e.g., a list of applications, an indication that malware is installed, etc.), policy enforcement state information (e.g., password policy enforcement state, etc.), and/or any other device state-related information. The device management server 130 uses the state information to determine a security posture of the mobile device 110 and/or components thereof. The device management server 130 generates security posture information including a service identifier associated with a particular service, a posture value indicating the device posture, a posture expiration time (e.g., timestamp), and/or other information. In various embodiments, the security posture information and/or portions thereof are encrypted and/or otherwise secured at the device management server 130 using encryption information associated with the service node 140. The device management server 130 provides the security posture information to the mobile device 110. In certain cases, the security posture information is provided to the device management agent 112. The device management agent 112 provides the security posture information to one or more managed applications 116 via, for example, the secure communication bus 118.

In various embodiments, the device management agent 112 and/or other component of the mobile device 110 generates device-level security posture information. Device-level security posture information may be generated using similar techniques to those used by the device management server 130 to generate security posture information. In certain cases, the device-level security posture information is added to the security posture information from the device management server 130. In some cases, the device-level security posture information replaces the security posture information generated at the device management server 130. The device management agent 112 provides the device-level security posture information to one or more managed applications 116.

According to some embodiments, security posture information is embedded in messages, traffic, and/or other communications from a managed application 116 to the service node 140. In some cases, a library associated with a managed application embeds the security posture information into a message sent from the managed application 116 to the service node 140. The security posture information may, for example, be embedded (e.g., injected, added to, etc.) the header of message, embedded in the payload (body) of a message, embedded in a footer of a message, added as a tag in a message, and/or otherwise associated with a message. The message with embedded security posture information is sent to the service node 140.

In some embodiments, the service node 140 extracts the security posture information from the message and analyzes the security posture information. The security posture information may be extracted from the message by, for example, decrypting portions of the message using service node encryption information (e.g., a public key, a shared secret between the service node 140 and device management server 130, etc.). The service node 140 analyzes the security posture information. In the event that analysis of the security posture information indicates that the device 110 is secure, the service node 140 provides the device 110 access to service(s) 150. In the event that analysis of the security posture information indicates that the device 110 is not secure and/or partially secure, the service node 140 denies the device 110 access to service(s) 150. In certain cases, the service node 140 may perform additional operations to validate the mobile device 110 for access to the service. The service node 140 may, for example, contact the mobile device management server 130 for additional/updated security posture information to determine whether to grant the mobile device 110 access to a service 150.

Figure 1B:
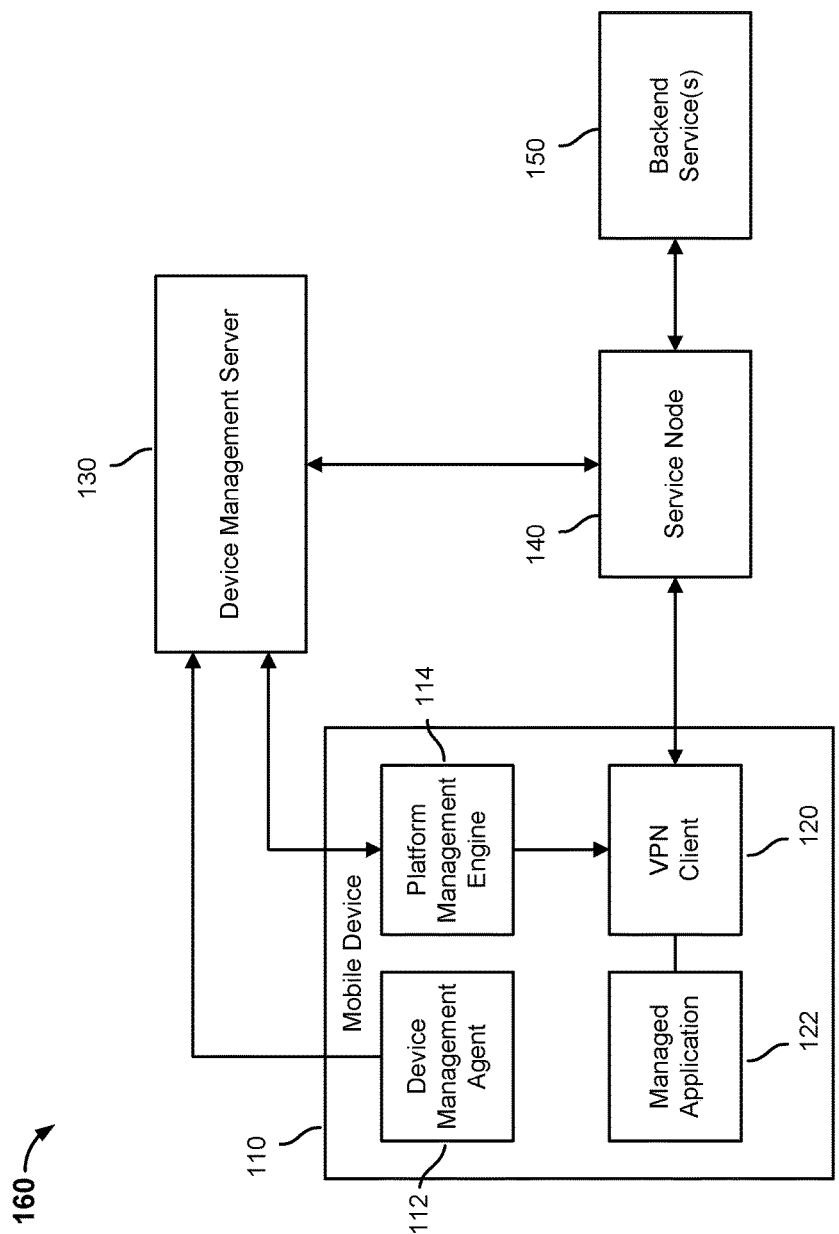
FIG. 1B is a block diagram illustrating embodiments of a system to embed security posture information into network traffic.

FIG. 1B is a block diagram illustrating embodiments of a system to embed security posture information into network traffic. In various embodiments, system 160 includes various similar components to system 100 of FIG. 1A. In the example shown, a system 160 includes a mobile device 110, device management server(s) 130, service node 140, back-end services 150, and/or other components. The mobile device 110 includes a device management agent 112, platform management agent 114, virtual private network (VPN) client 120, managed application 122, and/or other components. In various embodiments, the VPN client 120 is associated with the operating system of the device. The VPN client 120 may be embodied in an application and/or may be a component of the operating system. In some cases, the VPN client 120 is configured to communicate with the service node 140 (e.g., exclusively configured to communicate with the service node 140). The VPN client 120 may, for example, establish a secure tunnel to the service node 140. One or more managed applications 122 on the mobile device 110 are configured to send/route traffic (e.g., all traffic) to the VPN client 120 for secure transmission to the service node 140. For example, the platform management engine 114 may configure one or more applications to send all traffic through the VPN client 120 (e.g., when a VPN connection exists). In various embodiments, a VPN client 120 may operate at the Transmission Control Protocol (TCP) level, the internet protocol (IP) level, and/or other level depending, for example, on the operating system used on the device 110.

In various embodiments, security posture information is received at the platform management engine 114 and provided to the VPN client 120. The VPN client 120 may store the security posture information. In various embodiments, the VPN client 120 and/or other component of the mobile device 110 generates device-level security posture information. Device-level security posture information may be generated using similar techniques to those used by the device management server 130 to generate security posture information. In certain cases, the device-level security posture information is added to the security posture information from the device management server 130. In some cases, the device-level security posture information replaces the security posture information generated at the device management server 130.

In some embodiments, a managed application 122 (e.g., configured to route traffic to the VPN client 120) provides a message to the VPN client 120 for transmission to the service node 140. The VPN client 120 receives the message and embeds the security posture information into the message using various techniques disclosed herein. The VPN client 120 then passes the message with embedded security posture information to the service node 140. In various embodiments, the service node 140 processes security posture information to, for example, validate the mobile device 110 for access to service(s) 150, deny the mobile device 110 access to service(s) 150, and/or perform other operations.

Figure 2:
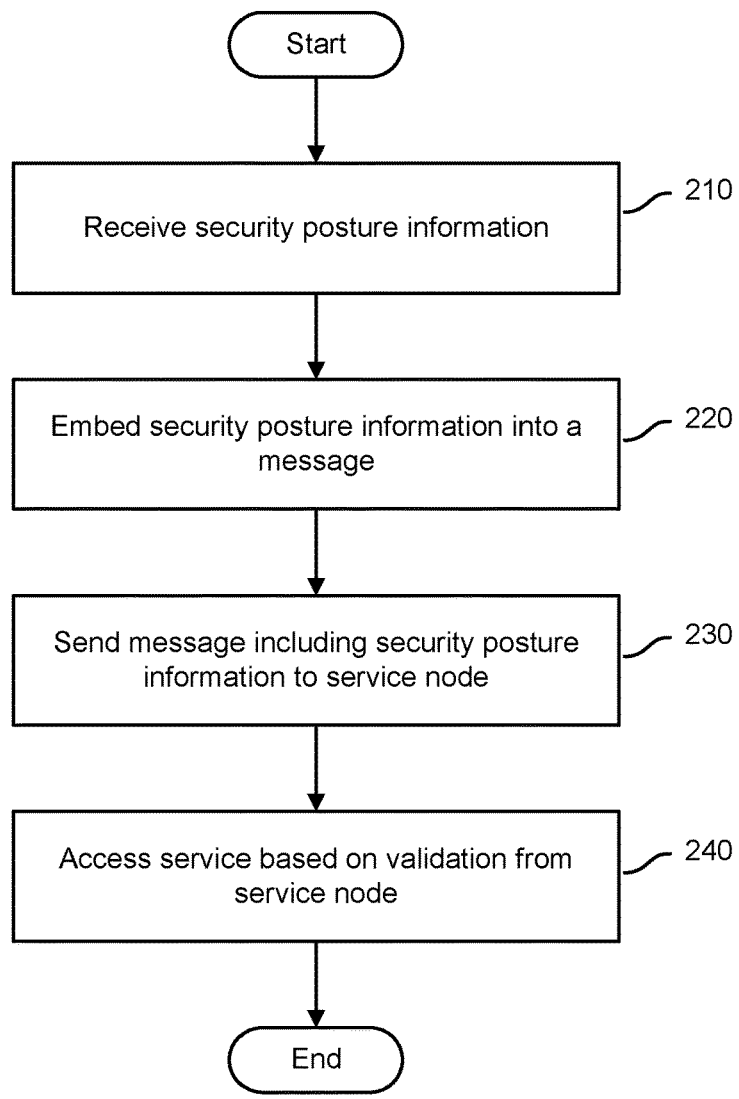
FIG. 2 is a flowchart illustrating embodiments of a process to embed security posture information into a message.

FIG. 2 is a flowchart illustrating embodiments of a process to embed security posture information into a message. In various embodiments, the process 200 is performed at mobile device 110 of FIG. 1A and FIG. 1B. At 210, security posture information is received. In some embodiments, security posture information is received at a mobile device from a device management server. Security posture information may be generated at a device management platform that manages the mobile device and/or portions thereof. The security posture information may be generated based on, for example, state information received from the mobile device and/or components on the mobile device. In some embodiments, security posture information includes a security posture value, a posture expiration time, service identifier(s), and/or other information. The posture value may indicate a posture associated with the mobile device and/or components thereof. Example device postures include without limitation secure (good), partially secure, unsecure (bad), and/or any other posture. In the event a device posture indicates the device is partially secure and/or not secure, the posture value may indicate a reason including without limitation jailbroken, rooted, unauthorized application (malware) installed, password policy violated, password policy insufficient, and/or any other security posture. In various embodiments, the posture value may include, for example, a hex value (e.g., 0xFFBB), string, and/or other value representing a posture of the mobile device and/or components thereof. The device management server may include a data structure mapping security postures (e.g., not secure because device is jailbroken) to security posture values (e.g., 0x003). Posture expiration information may include a timestamp and/or other time-related information indicating, for example, a time at which the posture value expires and/or is no longer valid. A service identifier(s) (service IDs) may include a value unique to a particular a service, such as hexadecimal value, number, and/or any other value. Security posture information and the generation thereof are discussed in further detail below.

According to some embodiments, security posture information received at the mobile device is cryptographically obscured. The security information may be cryptographically obscured in such a manner that the service node is able to access the security posture information while the security posture information is inaccessible at the mobile device. For example, the security posture information may be encrypted using a key associated with the service node, a shared secret between the service node and the device management server, and/or other cryptographic information. In these cases, the service node possesses cryptographic information (e.g., a service node private key, a shared secret, etc.) usable to extract the security posture information. The mobile device and/or components thereof, in various embodiments, may not include cryptographic information needed to extract, decipher, and/or otherwise view the security posture information. Cryptographically obscuring the security posture information so that the mobile device does not have access to the information may help to ensure that a malicious user and/or application would not be able to manipulate the security posture information to gain unauthorized access to the service.

In various embodiments, security posture information is received at a management agent on the mobile device. The management agent may include a management agent associated with the device management server. In this case, the management against may not be associated with the device OS (e.g., the management agent is not a platform management agent). The management agent manages the operation of one or more managed applications on the device. The management agent may provide the security posture information to one or more managed applications and/or a librar(ies) associated with the managed applications. In this case, the managed application performs the embedding operation discussed below.

In some embodiments, security posture information is received at platform management engine (e.g., OS management engine) and provided to one or components of the OS including, for example, a virtual private network (VPN) client. In one example, the security posture information is sent from the device management server to the platform management engine. The platform management engine provides the security posture information to a VPN client associated with the mobile device. The VPN client may include a VPN client configured to communicate with the service node. The VPN client may be a component of the OS on the device. In this case, the VPN client performs the embedding operations as discussed below.

At 220, the security posture information is embedded into a message. In various embodiments, security posture information is embedded into a message sent from a mobile device, an application on the mobile device, and/or other component to a service via a service node. The message may include any type of communication, data, and/or information sent from a mobile device to a service via a service node. The message may be associated with one or more logical layers including the physical layer, network layer, transport layer, application layer, and/or any other layer. The message may include a message sent according to various protocols, such as a hypertext transfer protocol (HTTP) message, Institute of Electrical and Electronics Engineers (IEEE) 802.11 message (e.g., Wi-Fi, wireless local area network (WLAN), and/or other messages), Dynamic Host Configuration Protocol (DHCP) message, Domain Name System (DNS) message, Transport Control Protocol (TCP) message, Transport Layer Security (TLS) protocol message, Secure Sockets Layer (SSL) message, and/or any other type of message.

In various embodiments, a message may include any type of message that is normally sent from a mobile device to a service via the service node. In one example, the message is not specifically generated to send security posture information from the mobile device to service node. Rather, the security posture information is included in a message that would normally be sent to the service node and/or service via the service node. In effect, the security posture information is appended to (e.g., hitches a ride on) a message already intended to be sent to the service node.

In some embodiments, the security posture information is embedded in the message by adding the security posture information to a portion of the message. The message may be augmented to include the security posture information. In one example, the security posture information may include a tag added to message and/or other communication between the mobile device and service node. In another example, security posture information is added to a header of a message. In a further example, the security posture information is added to the body (payload) of a message. The embedding techniques disclosed herein provide several example embedding approaches, any other approaches of embedding information into a message may be used to add the security posture information to a message.

In various embodiments, security posture information is embedded in a header of an HTTP message. In this case, the security posture information is embedded at the application layer—in an HTTP message. In one example, a field including the security posture information is added to the header of an HTTP message. The added field may include the security posture information. In another example, the security posture information is added to an existing field of an HTTP header.

In some embodiments, an email client provides a mechanism, such as a hook, to inject information into a header of an email communication. In one example, a native email client (e.g., iOS native email client) provides a hook to inject an additional field into a header of an email request (e.g., Exchange email request). The additional field may include a string (e.g., X-Apple-Config-Magic string), and the native email client may be configured to add the security posture information as a string in the additional field. The native email client may be configured by the device management engine to inject the security posture information into various email requests and/or other messages.

In some embodiments, security posture information is embedded in a Wi-Fi protocol message (e.g., an IEEE 802.11 message). In some cases, security posture information is embedded in a portion of a Wi-Fi user profile for a device. The security posture information may, for example, be included in a Wi-Fi user identifier for the device and/or device user. In this case, the security posture information may be encrypted using a security key associated with the service, a shared secret between the service node and device management server, and/or other encryption information. In this case, the Wi-Fi user identifier may include, for example, userid:hmac-sha256 (encrypted security posture information). As discussed below, the security posture information included in the Wi-Fi user identifier (user ID) is evaluated at a Wi-Fi controller—a service node—to determine whether a mobile device is authorized to access a Wi-Fi network.

According to some embodiments, security posture information is embedded in a DHCP protocol message. The security posture information may be included in a DHCP query message and/or other DHCP message. In one example, the security posture information is added to an "xid" field and/or any other field of the DHCP protocol message. The "xid" field may include a transaction ID. The transaction ID may include a random number chosen by the client. In certain cases, the security posture information is embedded in the transaction ID included in the "xid" field of a DHCP message sent to the service node.

In various embodiments, security posture information is embedded in a DNS message. The security posture information may be embedded in DNS query message (e.g., a user datagram protocol (UDP) message) sent to the service node. In one example, the security posture information is encoded into a header of DNS query, DNS response, and/or other DNS message. The security posture information may be encoded into the "Transaction ID" field of a DNS query.

The "Transaction ID" may include a 16-bit identifier assigned by the entity that generates any kind of request. This identifier is copied in the corresponding reply and can be used by the requestor to match replies to outstanding requests, or by the server to detect duplicated requests from some requestor. The security posture information may be embedded into the 16-bit identifier.

In some embodiments, security posture information is embedded in a TCP message. In one example, security posture information is encoded into a SYN number included in a TCP SYN cookie. In another example, the TCP protocol is extended to support device posture information. In this case an initiator and/or responder cookie may include security posture information and/or other policy information.

In various embodiments, security posture information is embedded in a TLS or SSL protocol message. In one example, the security posture information is encoded into a TLS/SSL a ClientHello message sent to the service node as part of a TLS/SSL handshake. The security information may be encoded in, for example, the client session_id, client random value, and/or other information/fields included in the ClientHello message. In some cases, the security posture information may be hashed, and the hashed security posture information may be included in the client random value. In another example, the security posture information is included in a TLS/SSL identity certificate for the mobile device and/or component thereof. In various embodiments, the service node (e.g., a reverse proxy, firewall, Wi-Fi access point, VPN server) receives the TLS/SSL handshake message from the mobile device, extracts the security posture information, and determines based on the security posture information whether to grant the mobile device access to the service. In some cases, the service node extracts the security posture information by decrypting the information using a service node encryption key (e.g., private key), a shared secret between the service node and device management platform, and/or other encryption information. Once extracted, the security posture information is evaluated to determine whether the mobile device and/or components thereof are authorized to access the service. In certain cases, the security posture information is hashed (e.g., at the device management server), and the service node extracts the hashed security posture information and communicates with the device management platform to validate the mobile device for access to the service. For example, security posture information included in the client random value may be hashed.

According to some embodiments, security posture information is embedded in a message at an application, such as a managed application. In this case, the security posture information is inserted at the application level and passed to the service node as part of network traffic from the application. In some cases as discussed above, a management agent receives security posture information from a device management server, and the management agent provides the security posture information to a managed application. The managed application may store the security posture information in application storage local to the application. The managed application may retrieve the security posture information from the storage and embed the security posture information into a message sent to the service via the service node. In various embodiments, a wrapper, library, and/or other code associated with the application embeds the security posture information into a message. A wrapper, library, and/or other code may embed the security posture information into the message as the message is sent and/or prepared to be sent to the service node.

In various embodiments, security posture information is embedded in a message at a VPN client. The VPN client receives a message from an application on the device, and the VPN client embeds the security posture information into the message. In some embodiments, certain applications, such as managed applications, are configured to send traffic through the VPN client. The applications may, for example, send messages to the VPN client for transmission to the service node. In certain cases, the VPN client receives a message, embeds the security posture information into the message, and sends the message to the service node via, for example, a VPN tunnel.

At 230, the message including the security posture information is sent to the service node. The message including security posture information is sent from the mobile device to the service node. In some embodiments, a message is sent from a managed application, which embedded the security posture information into the message, to a service node. In this case, with the embedded security posture information, the message is passed to the service node as part of communication traffic (e.g., regular traffic) between the mobile device and the service node. The process of sending the message from the managed application to service node may depend on the type of message sent (e.g., HTTP message, Wi-Fi message, etc.), type of service node (e.g., reverse proxy, Wi-Fi controller, firewall, etc.), and/or other parameters. In some embodiments, the process of sending the message to the service node is not dependent on the security posture information being embedded in the message, and any typical process of sending traffic to the service node may be used.

In various embodiments, the message is sent from a VPN client to the service node. In this case, the VPN client establishes a secure connection (e.g., a secure communication tunnel) to the service node, such as a VPN server, reverse proxy, and/or other node. The secure connection and/or secure tunnel may be established prior to sending the message with the security posture information. The message including the security posture information is sent to the service node via the secure tunnel between the VPN client and the service node.

According to some embodiments, the message including security posture information is received at the service node. The service node extracts the security posture information, and/or evaluates the security posture of the mobile device. In one example, the service node allows or denies the mobile device access to the service based on the evaluation of the security posture information. If, for example, the security posture information includes a security posture value indicating the security posture of the device is acceptable (e.g., good, pass, etc.), includes a security posture expiration that has not expired, and/or other information; the service node validates the mobile device to access the service. In the event the event the security posture information indicates that the security posture of the device is not acceptable (e.g., un-secure, bad, fail, etc.), the service node may block access to the service and/or perform other actions. Additional operations may include, for example without limitation sending the mobile device a notification indicating that access is denied, sending commands to the device which if performed would bring the device into compliance, connecting to the device management platform to validate the device, and/or other operations. The processing performed at the service node is discussed in further detail below.

At 240, a service is accessed based on validation from the service node. In various embodiments, the service node evaluates security posture information included in a message sent from the mobile device, and validates mobile device for access to a service based on the evaluation of the security posture information. The service node may validate the mobile for access to one or more services, such as enterprise email, a company intranet, enterprise servers, and/or any other services and/or resources. Upon validation of the mobile device, the service node (e.g., reverse proxy, Wi-Fi controller, VPN provider, firewall, etc.) provides access to the service.

Figure 3:
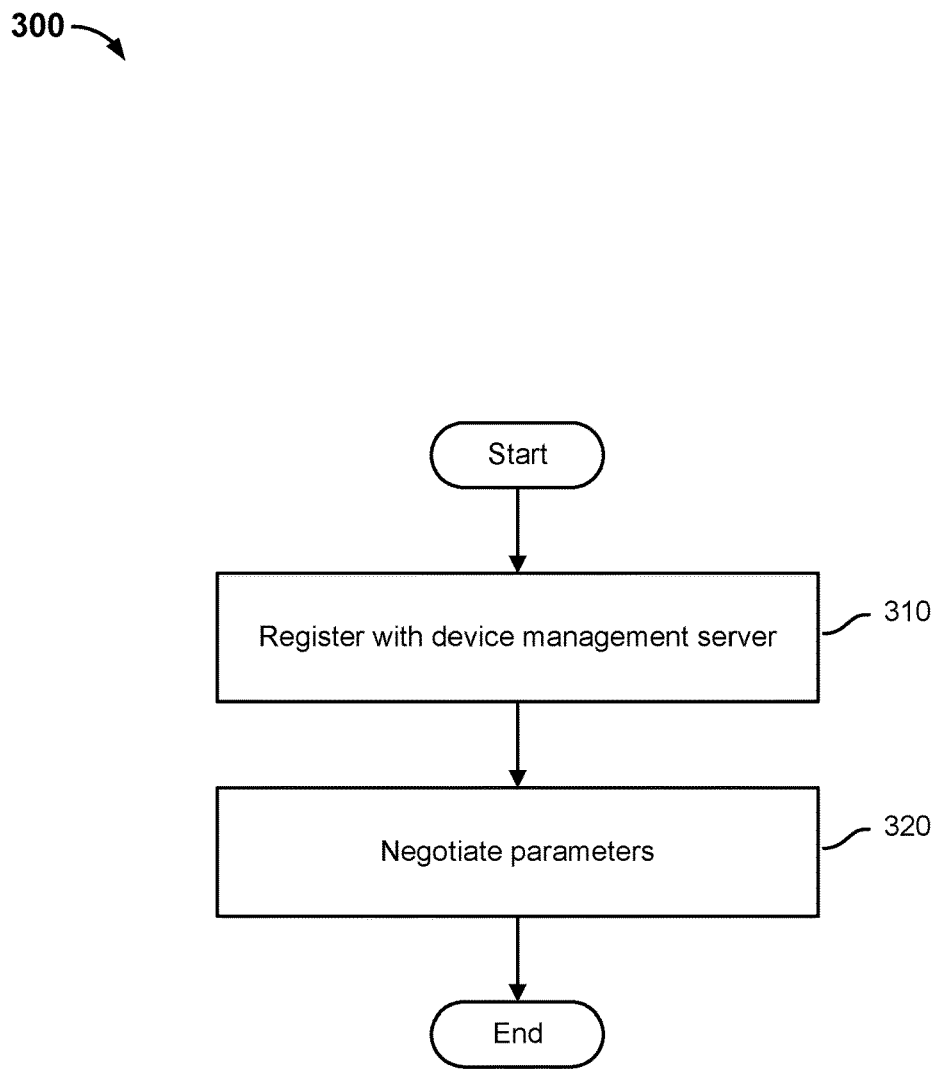
FIG. 3 is a flowchart illustrating embodiments of a process to register a service node with a device management server.

FIG. 3 is a flowchart illustrating embodiments of a process to register a service node with a device management server. In various embodiments, the process 300 is performed at one or more of service node 140 and device management servers 130 of FIG. 1A and FIG. 1B. At 310, the service node registers with the device management server. In various embodiments, a device management server initiates registration with a service node. In one example, a device management server may configure a Wi-Fi controller, firewall, VPN provider, and/or other component for operation in an MDM environment. In another example, the service node may include components of reverse proxy associated MDM architecture. The reverse proxy may be configured and/or controlled by the device management server to perform various operations. In a further example, a service node may be registered with the device management server via a console and/or interface at the device management server. An administrator may, for example, register the service node and/or enter various parameters. In some embodiments, the service node may initiate registration with the management server.

At 320, security posture-related parameters are negotiated. In various embodiments, a service node and device management server negotiate parameters used to embed security posture information in messages sent by the mobile device to the service node. The parameters establish a framework for the device management server to generate security posture information and/or for the service node to decipher the security posture information received from the mobile device. In various embodiments, the parameters negotiated between the service node and device management server include one or more of a service identifier (service ID), service node encryption information, protocol type(s), security postures and associated security posture values, security posture expiration periods, and/or other parameters.

In some embodiments, a service identifier includes a unique identifier associated with the service node. Each of a plurality of services may be associated with a service identifier. The service identifier may include, for example, a hexadecimal value (e.g., 0x1234) that corresponds to a particular service (e.g., a Wi-Fi access point). The device management server may include the service identifier in the security posture information to identify the service node that is the intended recipient of the security posture information. And the service node uses the service identifier to determine and/or verify that the service node is the intended recipient of the security posture information. The service node may, for example, only monitor for the security posture information including particular service identifier(s) associated with the service node.

In various embodiments, service node encryption information includes key(s), a shared secret, and/or other information known only to the device management server and/or service node. In one example, the device management server and service node may negotiate encryption keys to be used in securing (encrypting) portions of security posture information provided to the mobile device for inclusion in a message to be sent to the service node. The device management server may be provided, generate, and/or negotiate a public key associated with the service node. The device management server may use the public key to encrypt portions of the security posture information provided to the mobile device for inclusion in message(s) to the service node. The service node may generate and/or negotiate a corresponding private key used to decrypt the encrypted portions of the security posture information. In another example, the device management server and service node negotiate a shared secret. Similar to a private-public key pair, the shared secret is used to cryptographically-obscure the portions of the security posture information at the device management server and to extract the portions at the service node. In a further example, the device management server and service node negotiate a hash function (e.g., HMAC-SHA256, etc.) and/or hash parameters to be used in hashing portions of the security posture information. The hash function and/or associated parameters may be used at the device management server to generate hashes of security posture information, such as security posture values, posture expiration information, and/or other security posture information. In some embodiments, hashed security posture information is stored in a hash table and/or other data structure at the device management server. In certain cases, the hash table and/or other data structure is provided to the service node, and the service node may use the hash table to decipher hashed security posture information embedded in messages from the mobile device.

In some embodiments, the device management server and service node negotiate one or more communication protocols to be used in transport of security posture information. Protocols may include without limitation HTTP, IEEE 802.11, DHCP, L2 Broadcast, TCP, SSL, TLS, and/or any other suitable communications protocol.

In various embodiments, security postures and associated posture values are negotiated. A posture value may include a hexadecimal value, a binary value, a set of characters, and/or any other type of value that represents a particular security posture. Each of a plurality of security postures is associated with a posture value. In some embodiments, a data structure is generated and/or stored at the device management platform. The data structure includes a mapping of each of a multiple security postures (security posture identifiers) to a posture value. Table 1 includes an example mapping of security postures to posture values.

TABLE 1

Example mapping of security postures to corresponding posture values

| Mobile Device Security Posture | Posture Value |
|---|---|
| Secure | 0x001 |
| Not Secure | 0x002 |
| Device not secure—jailbroken | 0x003 |
| Device not secure—rooted | 0x004 |
| Device not secure—unauthorized application(s) installed | 0x005 |
| Device not secure—password policy violated | 0x006 |

As illustrated in Table 1, a security posture of mobile device secure is associated with a posture value of 0x001, mobile device not secure is associated with a posture value of 0x002, mobile device not secure because device is jailbroken is associated with a posture value of 0x003, mobile device not secure because device is rooted is associated with a posture value of 0x004, mobile device not secure because device includes unauthorized applications is associated with a posture value of 0x005, mobile device not secure because device password policy violated is associated with a posture value of 0x006, and so on. The device management server includes the security posture values in security posture information sent to a mobile device for inclusion in a message sent to the service node (as discussed below). In various embodiments, a data structure mapping mobile device security postures to posture values is stored at the service node. The data structure is used at the service node to map security posture values to corresponding device security postures. In one example, a service node extracts a posture value from the security posture information and uses the data structure to determine a device security posture associated with the posture value.

In some embodiments, a security posture expiration period is negotiated. A security posture expiration period may include a period of time that a particular set of security posture information is to be trusted (e.g., valid). An expiration period may include a number of days, weeks, and/or other period of time. In some embodiments, various service nodes may each require different security posture expiration period depending, for example, on the level of security associated with the node. In one example, a first service node and/or associated service(s) are associated with a security posture expiration period of one month, and a second service node and/or associated service(s) are associated with a security posture expiration period of one week. The device management server generates security posture information including, for example, a service identifier, security posture value, a timestamp, and/or other information. The timestamp included in the security posture information may be calculated based on the security posture expiration period.

Figure 4:
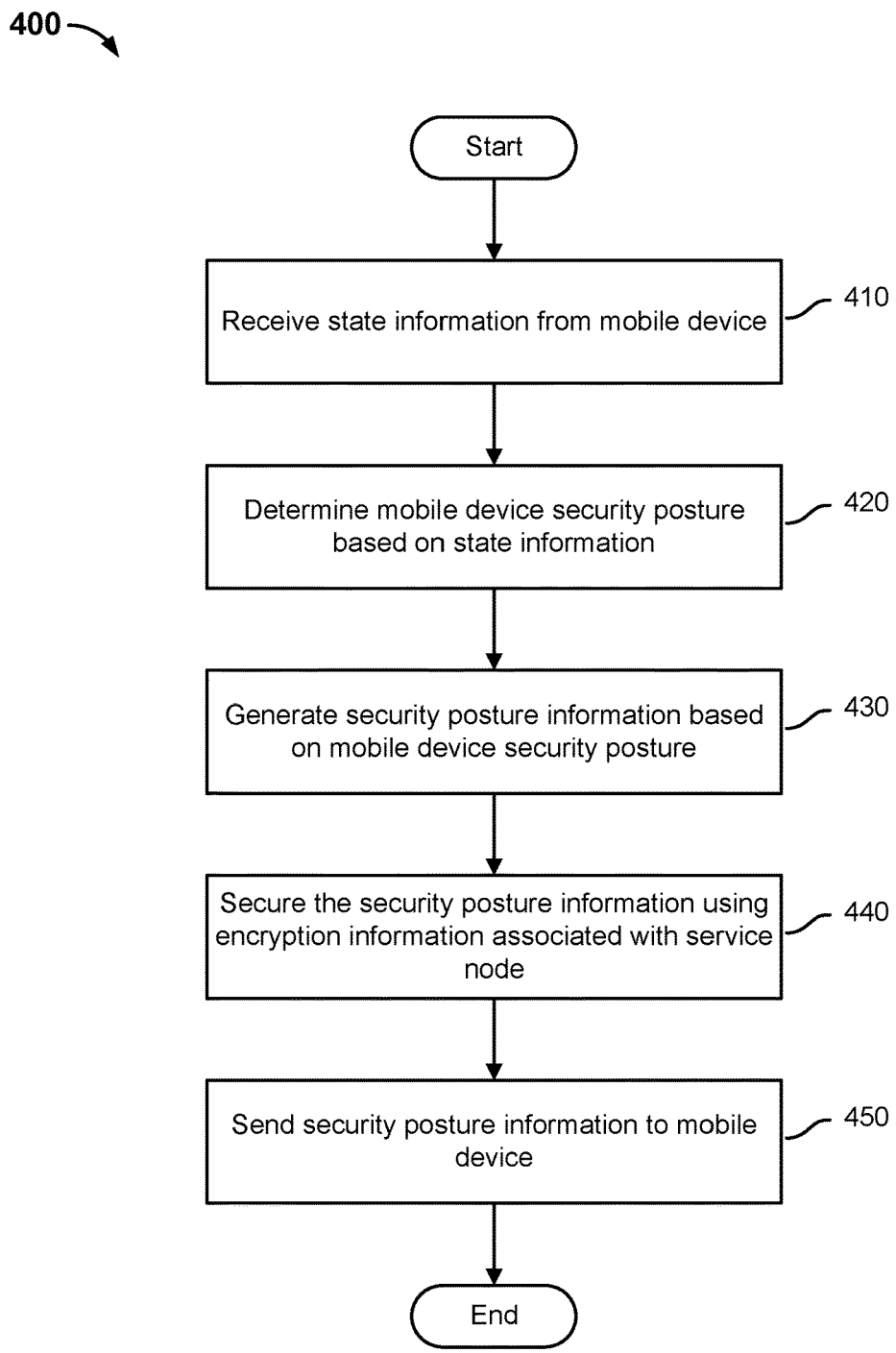
FIG. 4 is a flowchart illustrating embodiments of a process to send security posture information to a mobile device.

FIG. 4 is a flowchart illustrating embodiments of a process to send security posture information to a mobile device. In various embodiments, the process 400 is performed at device management server 130 of FIG. 1A and/or FIG. 1B. At 410, state information is received from the mobile device. According to some embodiments, state information is received from the mobile device periodically, at predetermined intervals, in response to specific events, and/or at any other time. In one example, the device management server sends requests for state information, and the mobile device and/or components thereof respond by reporting the state information. The state information may be received at the device management server from, for example, a management agent associated with the device management platform, a platform management agent included in the operating system (OS) of the mobile device (e.g., an OS management engine, OS management agent, etc.), and/or other component of the mobile device.

In various embodiments, a platform management engine may send state information including application inventory information, policy enforcement state information, and/or other state information. Application inventory information may include, for example, a list of applications installed on the device, information identifying any unauthorized applications (malware) installed on the device, and/or any other application-related information. Policy enforcement information may include information indicating whether various policies are in effect. For example, the policy enforcement information may indicate a type of password policy applied to the device and the attributes of the policy, such as character length and/or complexity requirements, whether the password is a device-wide access password (e.g., screen-lock passcode), whether the passcode is applicable to specific managed applications, and/or other attributes. Policy enforcement information may also include information indicating whether the mobile device is compliant with various policies (e.g., has not violated various policies). Information relating to a wide variety of policies may be included in the policy enforcement information.

In some embodiments, a device management agent may send state information to the device management server. A device management agent may include a management agent installed by a mobile device management provider that is associated with the device management server. The device management agent may send to the device management server device state information, such as device has no issues, device is normal, device is secure, device is jailbroken, device is rooted, device in unstable, and/or any other device state. In various embodiments, application inventory information is generated by a management agent and/or platform agent on the device. For example, certain operating systems allow application scanning, in which an agent and/or other component can access the application binary to determine applications installed on the mobile device.

At 420, a security posture for the device is determined based on state information. In various embodiments, the device management server uses the state information received from the mobile device (e.g., management agent, platform management engine, etc.) to determine mobile device security posture(s). A mobile device security posture may be, for example, determined based on the application of rules to state information. Rules may, for example, define for each of a set of mobile device and/or application states a security posture to be applied to the device. Rules may be defined by an administrator, determined based on device management server settings, and/or otherwise generated. In one example, the state information received from a device management agent indicates that the device is in a secure state and state information received from the platform management engine indicates that the device is compliant with all applicable policies and does not include any unauthorized applications. In this case, the mobile device security posture may be determined, based on, for example, the application of one or more rules, to be secure, compliant, acceptable, and/or good. In another example, state information received from a device management agent indicates that the device is jailbroken. In this case, the security posture for the device may be determined, based on, for example, the application of one or more rules, to be not secure (non-compliant) because device is jailbroken. In a further example, state information received from a platform management engine includes application inventory information indicating that the mobile device includes one or more unauthorized applications. In this case, the device security posture may be set to, for example, unsecure unauthorized applications installed. In a further example, state information may indicate that the operating system on the device is not the latest version, and the security posture of the device may be determined, based on, for example, the application of one or more rules, to be partially compliant—old OS installed. The above examples illustrate several possible device security postures, but these examples are not an exhaustive list of all possible security postures contemplated by the present disclosure.

At 430, security posture information is generated based on the mobile device security posture. In various embodiments, security posture information includes service identifier(s), security posture value(s), posture expiration information, and/or other information. The service identifier includes an identifier associated with one or more services as discussed above. The security posture value is generated based on the mobile device security posture. In some embodiments, a mobile device security posture is mapped to a security posture value. For example, the device management server may include a data structure that includes mappings of mobile device security postures to corresponding security posture values. The mappings of mobile device security postures to posture values may be generated as part of a negotiation between the service node and device management server (as discussed in FIG. 3). Table 1 (discussed above) is an example data structure including mappings of device security postures to corresponding posture values. In certain cases, the mobile device management server selects a posture value that corresponds to the determined security posture of the device, and the selected posture value is included in the security posture information. In various embodiments, the security posture expiration information including, for example, a timestamp of a current time when the security posture information is generated, a time when the security posture information expires, and/or another time. As discussed below, the security posture expiration information (e.g., timestamp) may be used to determine whether the security posture information is still valid and/or can be trusted.

At 440, the security posture information and/or portions of the security posture information are secured using encryption information associated with the service node. In some embodiments, the device management server encrypts the security posture information and/or portions thereof using a public key associated with the service node. The public key may include a public key generated during a key generation operation (e.g., handshake) between the service node and the device management server. In this case, the service node includes a corresponding private key to decrypt the security posture information. In some embodiments, the device management server encrypts the security posture information and/or portions thereof using a shared secret between the device management server and the service node. The shared secret may be negotiated during a registration and/or encryption key operation (e.g., handshake) between the service node and the device management server. In some embodiments, the device management server encrypts the security posture information using encryption information based on Wi-Fi controller cookie information (e.g., a configuration cookie value). In this case, the service node may include a Wi-Fi controller. In various embodiments, the security posture information and/or portions thereof are hashed. The hashed security posture information is stored at the device management server and/or provided to the service node.

In various embodiments, portions of the security posture information are secured and other portions of the security posture information remain in the clear. In one example, security posture values and/or security posture expiration information are encrypted, hashed, and/or otherwise cryptographically obscured. In this case, the service identifier may be included in the security posture information in clear text (in the clear).

In some embodiments, security posture information is not secured (e.g., step 440 is not performed). In this case, the entire security posture information is sent to the mobile device in the clear (e.g., cleartext).

At 450, the security posture information is sent to the mobile device. In various embodiments, the device management server sends the security posture information to a management agent. In some embodiments, the device management server sends the security posture information to platform management engine. In some cases, the platform management engine is associated with the OS of the device.

Figure 5:
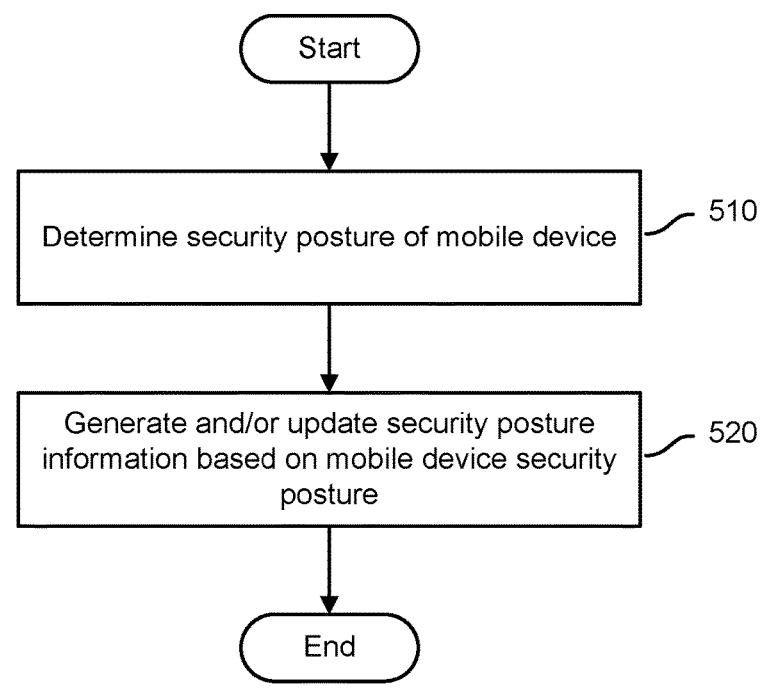
FIG. 5 is a flowchart illustrating embodiments of a process to generate security posture information at a mobile device.

FIG. 5 is a flowchart illustrating embodiments of a process to generate security posture information at a mobile device. In various embodiments, the process 500 is performed at a component of mobile device 110 of FIG. 1A and/or FIG. 1B, such as device management agent 112, platform management engine 114, VPN client 120, managed application 116, and/or any other component. At 510, a security posture of the mobile device is determined. Similar to security posture information generated at a device management server (discussed above), the device level posture may be generated based on mobile device state information and/or other information collected at the management agent, platform management engine, and/or other components on the device. The state information may include, for example, a device state (e.g., secure, unsecure, unsecure-jailbroken, etc.), application inventory information (e.g., a list of applications, an indication that malware is installed, etc.), policy enforcement state information (e.g., password policy enforcement state, etc.), and/or any other device state-related information. In various embodiments, a management agent and/or other component on the mobile device determines a device state by applying one or more rules to state information collected at the mobile device to determine a security posture of the device. The process of determining a device-level security posture may be similar to the process of determining the security posture at the device management server as discussed herein.

At 520, security posture information is generated and/or updated based on the mobile device security posture. In some embodiments, device-level security posture information is generated based on the security posture of the device and/or other information. Similar to the device management server generated security posture information, the device-level security posture information (on-board security posture information) may include service identifier(s), device-level security posture value(s), device-level posture expiration information, and/or other information. The device-level security posture value is generated based on the mobile device security posture determined by a component of the mobile device. In some embodiments, a mobile device security posture is mapped to a device-level security posture value. Similar to the device management server, the management agent and/or other node on the device may include a data structure that includes mappings of mobile device security postures to corresponding security posture values. Using the techniques disclosed herein, the mobile device management agent selects a posture value that corresponds to the determined security posture of the device, and the selected posture value is included in the security posture information. In some cases, the posture expiration information includes, for example, a timestamp of a current time when the device-level security posture information is generated, a time when the security posture information expires, and/or another time.

In various embodiments, the management agent and/or other component on the device updates the security posture information received from the management server. The management agent and/or other component on the device may update the security posture information to include a device-level posture value (e.g., on-board posture value), a device-level posture expiration time, and/or other security posture information. In various embodiments, the device-level security posture information is added to the security posture information received from the device management server. After addition of the device-level security posture information, the security posture information may include multiple sets of security posture information: a set of security posture information generated at the device management server and a set generated by the management agent and/or other component on the mobile device. In this case, the service node may receive both set of security posture information (as discussed below) and determine which of the multiple sets to use in evaluating the security posture of the device. In some cases, the service node may evaluate the security posture of the device based on the most recently generated security posture information. In one example, security posture information is generated at a device management server at a first time and a device-level security posture information is generated separately at a second time, which is later than the first time. The service node may evaluate the time when each set of security posture information was generated based on, for example, the security posture expiration information (timestamp) for each value. In this case, the service node may select the device-level security posture information because it provides a more recent snapshot of the security posture of the device.

In some embodiments, the security posture information and/or portions thereof received from the device management server are replaced by the device-level security posture information. In one example, security posture information received from the device management server includes a security posture value indicating that the device is secure (compliant). After the security posture information is received the management agent and/or other component on the mobile device may detect a condition indicating that the device is no longer secure, such as an attempt to jailbreak the device. In this case, the management agent and/or other component replaces the security posture value (e.g. 0x001) indicating the device is secure with a security posture value (e.g., 0x003) indicating the device is not secure because it is jailbroken. The security posture expiration may also be updated to a current time and/or time when the management agent detected the change in state from secure to jailbroken.

Figure 6A:
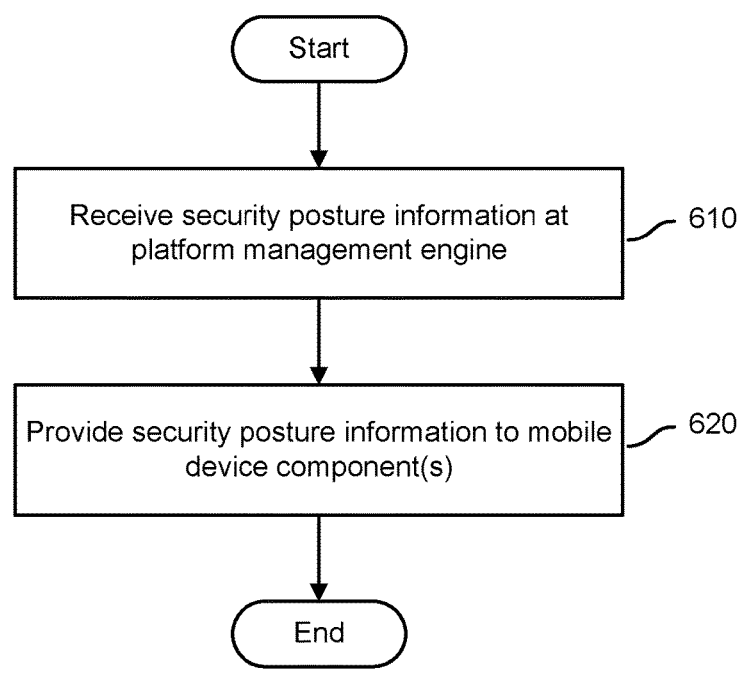
FIG. 6A is a flowchart illustrating embodiments of a process to receive security posture information at a mobile device.
Figure 6B:
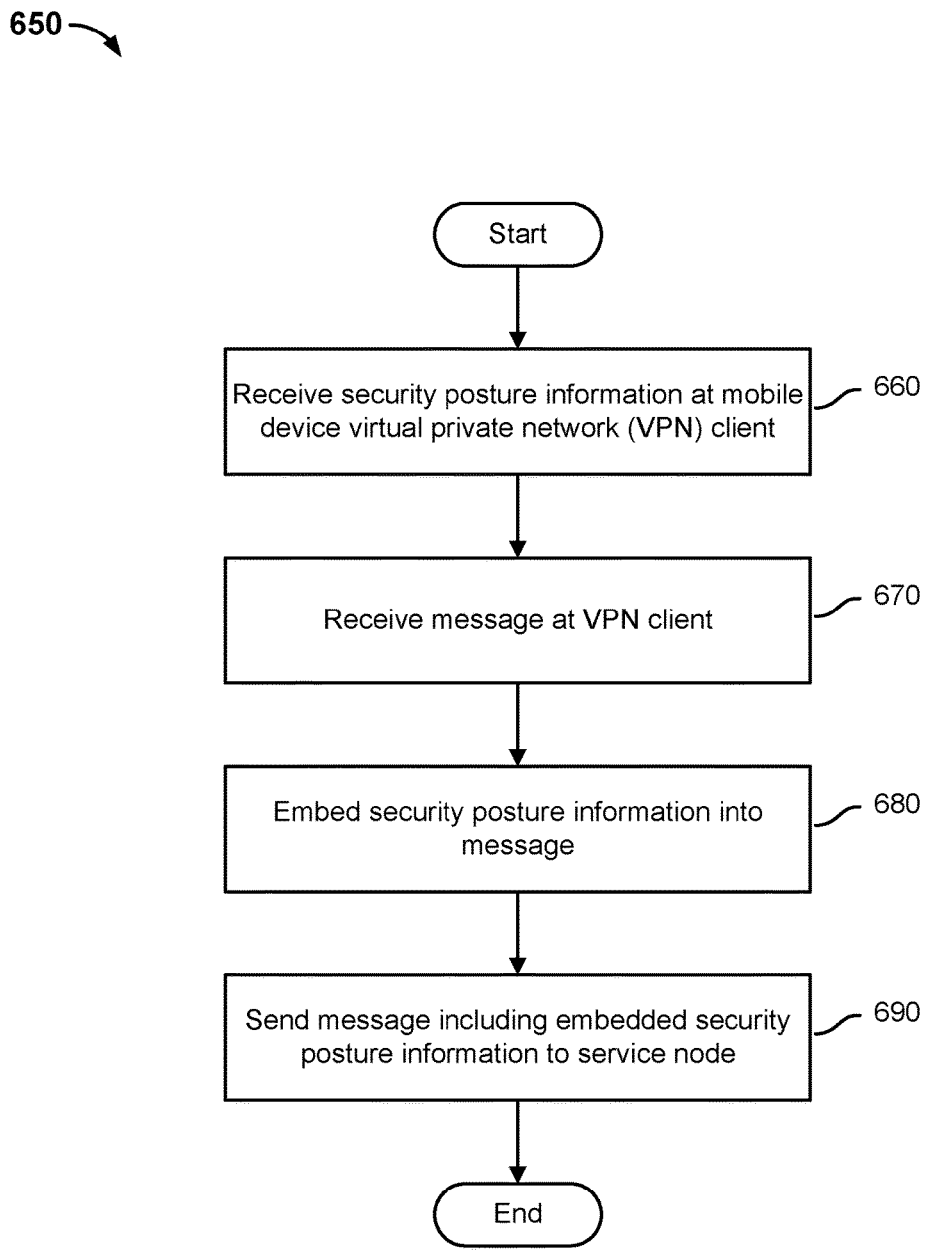
FIG. 6B is a flowchart illustrating embodiments of a process to embed security posture information into a message sent to a service node.

FIG. 6A is a flowchart illustrating embodiments of a process to receive security posture information at a mobile device. FIG. 6A and FIG. 6B each illustrate portions of a process to embed security posture information into a message at a mobile device. In some embodiments, the process 600 is performed at platform management engine 114 of FIGS. 1A and 1B. At 610, security posture information is received at a platform management engine. In various embodiments, the platform management engine receives the security posture information from a device management server, and evaluates the security posture information to determine one or more destination mobile device components, such as a VPN client and/or other components. In some embodiments, the platform management engine stores a copy of the security posture information prior to and/or after sending the information to the VPN client and/or other components.

At 620, the security posture information is provided to one or more mobile device components. In various embodiments, the security posture information is provided to a VPN client and/or other components associated with the operating system of the mobile device.

FIG. 6B is a flowchart illustrating embodiments of a process to embed security posture information into a message sent to a service node. In various embodiments, the process 650 is performed at VPN client 120 of FIG. 1B. At 660, security posture information is received at a VPN client. The security posture information may be received at the VPN client from a platform management engine. In some cases, the VPN client stores the security posture information. And the security posture information is embedded in messages sent to the service node for transmission to the service node as discussed below.

At 670, message(s) are received at the VPN client. In various embodiments, a message is received at the VPN client from an application configured to send application traffic to the VPN client. In certain cases, the operating system, platform management agent, and/or other component configures application(s), such as managed applications, to send all traffic through the VPN client. During normal operation of the device, the VPN client receives traffic from the applications and provides the traffic to a service node (e.g., reverse proxy, firewall, VPN provider, etc.) via a secure communication tunnel. In various embodiments, the VPN client is configured to monitor traffic (messages) sent to the service node and embed the security posture information into certain messages.

At 680, security posture information is embedded into a message. In various embodiments, the VPN client embeds the security posture information by modifying, augmenting, and/or otherwise processing the message to include the security posture information. In various embodiments, the VPN client is configured to embed security posture information into messages of a certain type, such as certain types of protocol messages, query messages sent to a service, discovery messages sent to a service node, security handshake messages to establish a secure connection to a service, and/or any other type of message. As discussed above, the VPN client may embed security posture information in a variety of messages including, for example, HTTP messages, Wi-Fi-related messages, DHCP messages, DNS messages, TCP messages, TLS protocol messages, SSL messages, and/or any other type of message. In one example, security posture information is embedded as a tag associated with and/or included in the message. In another example, the security posture information is included in a header of a message (e.g., an HTTP message) by modifying a field of the header to include the security posture information, by adding a field to the header including the information, and/or other modifying the header to include the information. In a further example, the security posture information is embedded in the body and/or payload of a message (e.g., an "xid" field of a DHCP message, a client random value of a TLS ClientHello message, etc.).

In various embodiments, the frequency at which security posture information is included in messages is dependent on a type of service. In one example, a first service may require that the security posture information be included in every request sent to the service, and a second service may require that security posture information be provided upon initial communications with service. In another example, a service may require that security posture information be provided to the service node once a day, once a week, and/or at any other interval.

In some embodiments, the VPN client generates device-level security posture information and includes the device-level security posture information in one or more messages. In this case, the VPN client may replace the security posture information from the device management server with device-level security posture information. In some cases, a VPN client receives security posture information generated at a device management server, and the VPN client updates the security posture information from the device management server to include device-level security posture information. In this case, security posture information includes two sets of security posture information: device management server-generated security posture information and security posture information generated at the VPN client. In various embodiments, security posture information including device management server-generated security posture information and VPN client-generate security posture information is embedded in a message.

At 690, the message including the security posture information is sent to the service node. In various embodiments, the VPN client sends the message to a service node via a secure communication tunnel between the VPN client and service node.

Figure 7A:
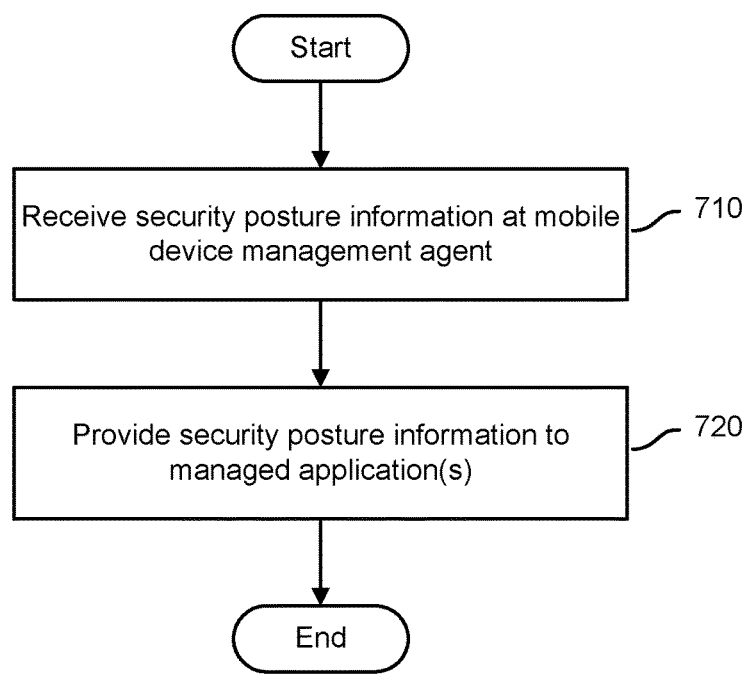
FIG. 7A is a flowchart illustrating embodiments of a process to provide security posture information to a managed application.
Figure 7B:
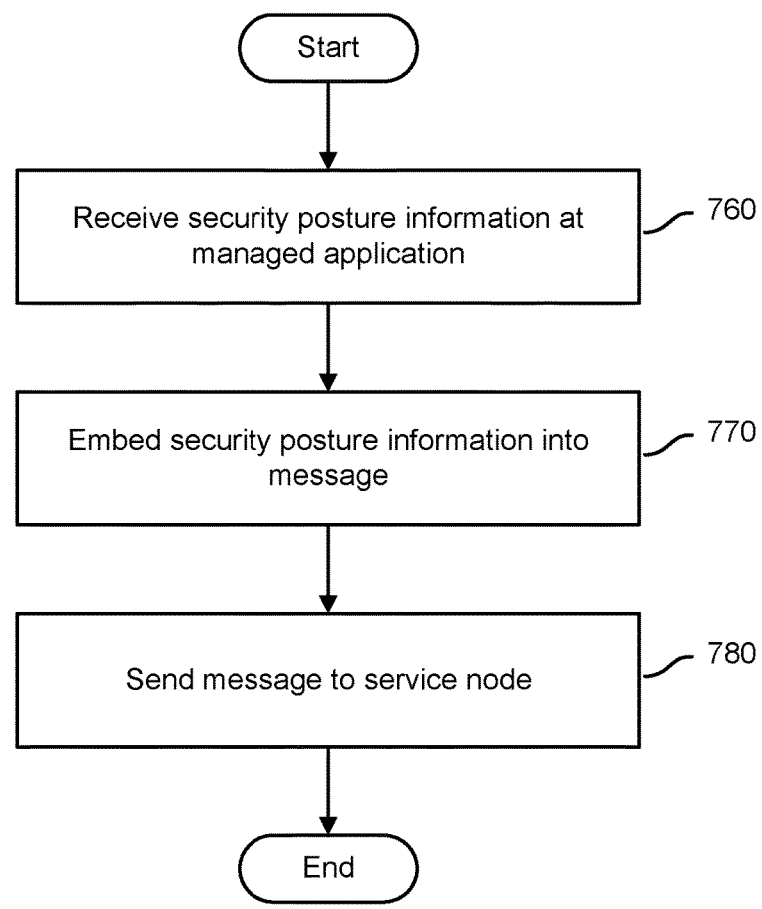
FIG. 7B is a flowchart illustrating embodiments of a process to embed security posture information into a message sent to a service node.

FIG. 7A is a flowchart illustrating embodiments of a process to provide security posture information to a managed application. FIG. 7A and FIG. 7B each illustrate portions of a process to embed security posture information into a message at a mobile device. In some embodiments, the process 700 is performed at management agent 112 of FIG. 1A. At 710, security posture information is received at a mobile device management agent. In various embodiments, the mobile device management agent receives security posture information from a device management server, and evaluates the security posture information to determine one or more mobile applications to receive the information. In one example, the device management server sends the management agent information indicating which managed applications are to receive security posture information. In another example, the security posture information is sent to a set of managed applications. The set of managed applications may include, for example, all managed applications installed on the device, a set of managed applications configured to communicate and/or access a service, a set of managed applications associated with a group, and/or any other set of managed applications. In some embodiments, the management agent stores a copy of the security posture information prior to and/or after sending the information to the managed applications.

At 720, the security posture information is provided to the managed applications. In various embodiments, security posture information is provided to a management application as part of application configuration information. For example, a device management agent may provide security posture information to a managed application in an OS-based configuration information/profile sent to the managed application. In another example, a device management agent may provide security posture information to a managed application as part of an MDM information/profile sent to the device.

In various embodiments, the management agent provides the security posture information to managed applications via a secure communication bus. In certain cases, the managed applications and/or management agent are configured to securely communicate with one another via a secure communications bus. A secure communication bus may include a process where the management agent stores encrypted information (e.g., an encrypted version of the security posture information) in a public storage location (e.g., a pasteboard) for retrieval by a managed application. The management agent provides the security posture information to the secure communication bus for retrieval by one or more managed applications. In some embodiments, the management agent provides the security posture information to the managed application using other data transfer techniques.

FIG. 7B is a flowchart illustrating embodiments of a process to embed security posture information into a message sent to a service node. In various embodiments, the process 750 is performed at managed application of FIG. 1A. At 760, security posture information is received at a managed application. In various embodiments, security posture information is received at a managed application from a management agent on the mobile device. As discussed above, the management agent may provide the security posture information to a secure communication bus for retrieval by the managed application. In this case, the managed application retrieves the security posture information from the secure communication bus. In various embodiments, the managed application may receive security posture information via any data transfer technique.

In various embodiments, the security posture information is received at a wrapper, library, and/or other component associated with the managed application. In one example, a managed application is modified to include a library by, for example, compiling the library into the application, injecting the library into the application, adding the library to the application by wrapping, adding the library as an SDK, and/or using another approach. The library (e.g., a wrapper) is configured to retrieve the security posture information. The library (e.g., wrapper) may, in certain cases, store the security posture information in storage local to the application device.

At 770, the security posture information is embedded in a message. In various embodiments, a managed application embeds security posture information into a message. In one example, a library embeds the security posture information into a message as the message is sent to the service node. The library may intercept a message, modify the message by embedding the security posture in the message, and pass the message with the embedded security posture information to the appropriate mobile device components for transfer to the service node. In various embodiments, a managed application, library associated with the managed application, and/or other component associated with the managed application may use any of the embedding techniques disclosed herein and/or known in the art to embed the security posture into the message.

At 780, the message with embedded security posture information is sent to the service node. In various embodiments, the message with embedded security posture information is provided to the appropriate communication modules (e.g., cellular, Wi-Fi, VPN, and/or other components) for transmission to the service node.

Figure 8:
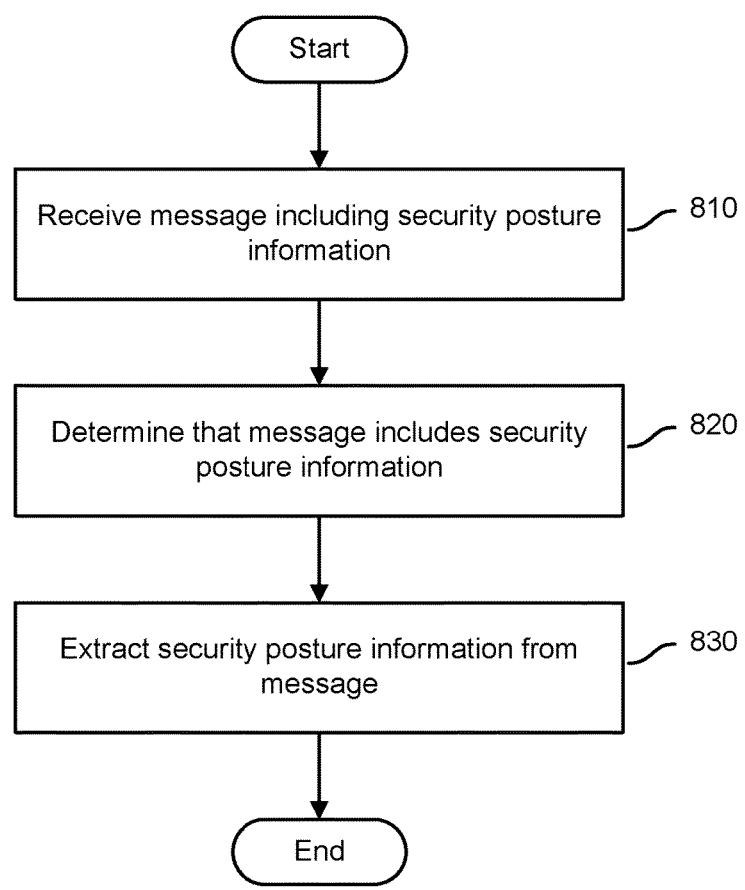
FIG. 8 is a flowchart illustrating embodiments of a process to extract security posture information from a message.

FIG. 8 is a flowchart illustrating embodiments of a process to extract security posture information from a message. In some embodiments, the process 800 is performed at service node 140 of FIGS. 1A and 1B. At 810, a message including security posture information is received. In various embodiments, the message including embedded security posture information is received from a mobile device and/or component thereof, such as a managed application, VPN client, and/or other component.

At 820, it is determined that the message includes security posture information. In various embodiments, the service node monitors for security posture information in messages received from mobile device(s). In certain cases, the service node is configured to identify a security posture information message based on a service identifier included in the security posture information. As discussed above, the service node and device management server negotiate a service identifier value to be included in security posture information intended for the service node. The service identifier may be included in the security posture information in clear text. In the event the service identifier is detected, the service may determine that it is the intended recipient of the security posture information.

At 830, security posture information is extracted from the message. In various embodiments, security posture information is extracted from a message by decrypting the security posture information and/or the encrypted portions thereof. The security posture information and/or portions of the security posture information may be decrypted using appropriate encryption information, such a service node private key, a shared secret between the service node and device management server, and/or any other encryption information. The type of encryption information used to decrypt the security posture information may be dependent on the encryption information used to secure the security posture information at the device management server. In some embodiments, the security posture information is sent in the clear, and the security posture information is directly extracted, read, and/or copied from the message.

In various embodiments, the security posture information is processed for analysis. The security posture value may be processed by mapping the posture value to a security posture. The service node may, for example, include a data structure (e.g., table) mapping each of one or more security posture values to a secure posture. This data structure (e.g., Table 1 discussed above), which is generated during registration with the device management server, may be used to determine a security posture corresponding to the security posture value included in the security posture information.

Figure 9:
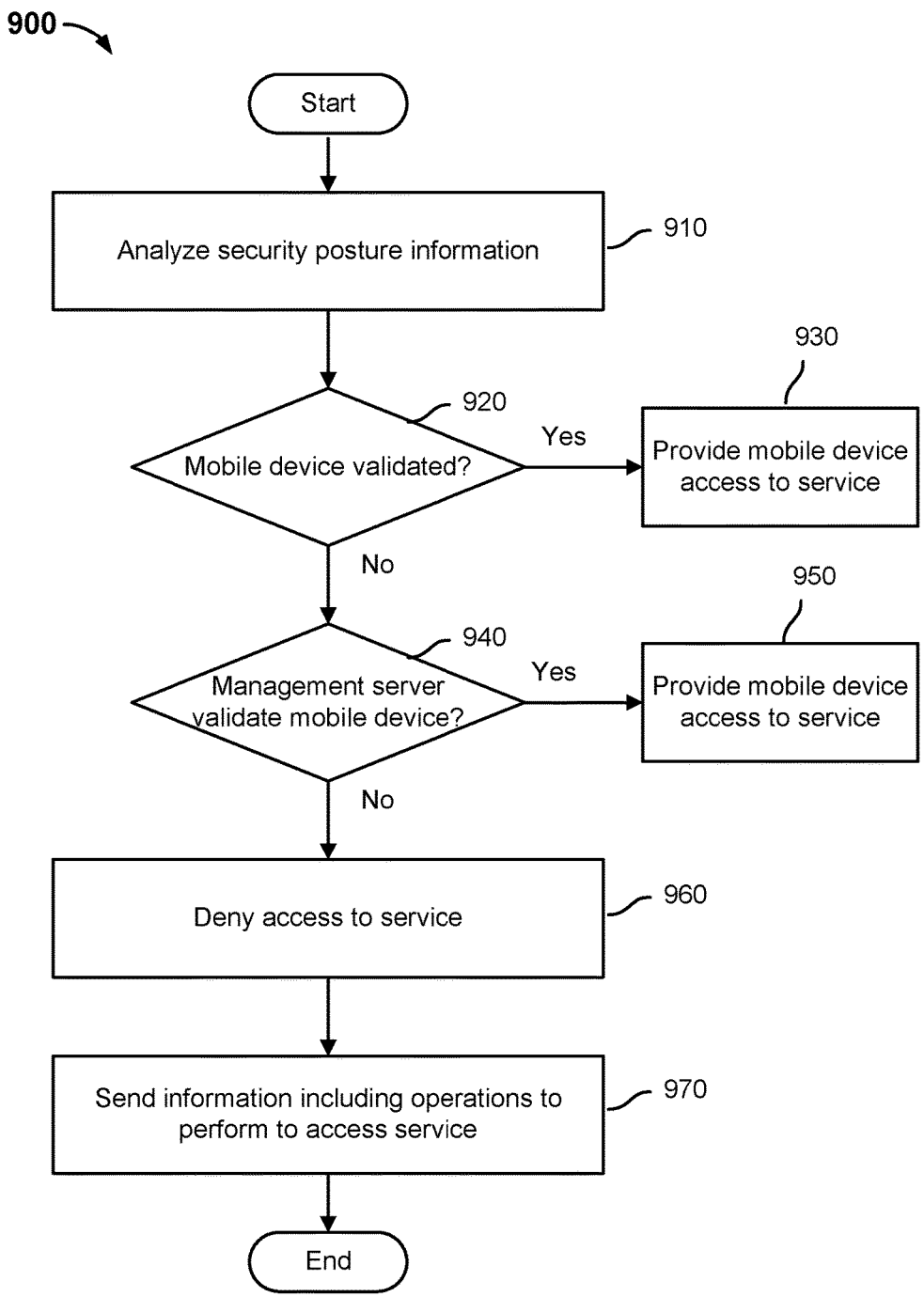
FIG. 9 is a flowchart illustrating embodiments of a process to analyze security posture information.

FIG. 9 is a flowchart illustrating embodiments of a process to analyze security posture information. In some embodiments, the process 900 is performed at service node 140 of FIGS. 1A and 1B. At 910, the security posture information is analyzed. In various embodiments, security posture information including, for example, a security posture value, security expiration information, and/or other information are analyzed. The security posture information may be analyzed based on or more policies, rules, and/or other information. In one example, a policy may include a list of allowable security postures (e.g., device is secure), unacceptable security postures (e.g., device is jailbroken, unauthorized applications are installed on device), security posture expiration periods, and/or other information. In certain cases, a policy includes operations and/or actions to perform when each of one or more security postures is applicable to a device. For example, a policy may dictate that when a security posture of a device is secure, the device is to be provided access to the service. In another example, a policy may dictate that when a security posture of a device is "not secure—device is rooted," the device is to be denied access to a service. In a further example, a policy may dictate that when a security posture of a device is "partially secure—operating system update needed," the device is to be denied access to a service and instructions are provided to the device to update the device OS.

In various embodiments, the policy may also include actions to be performed based on whether the security posture expiration period has elapsed or not. A policy including a security posture expiration period may be applied to security posture expiration time to determine whether the device is validated for access to the service. For example, a security posture timestamp is compared to a current time to determine a difference in time and/or amount of elapsed time. In the event the difference between a current time and the security posture timestamp exceeds the security posture expiration period it may be determined that the security posture information is not valid. Similarly, if the difference is less than the security posture expiration period, it may be determined that the security posture value, which indicates the device is secure, is valid.

At 920, it is determined whether the mobile device is validated for access to service(s). In various embodiments, policies are applied to the security posture information to determine whether the device is validated for access to service(s). In the event the device is validated for access to a service, the process proceeds to step 930. In the event the device is not validated for access to the service, the process proceeds to step 940 and/or in certain cases, the process may end and the device is denied access to the service.

In one example, security posture information extracted from a message includes a posture value that indicates that the device is secure and security posture timestamp of six days prior to the current time. A policy including a security posture expiration period of one week is applied to determine whether the device is validated for access to the service. The security posture timestamp is compared to a current time to determine an amount of elapsed time (six days), and the elapsed time is compared to the security posture expiration period of one week. In this case, the mobile device is validated for access to the service, and the process proceeds to step 930.

In a further example, security posture information extracted from a message includes a security posture value that indicates the device is partially secure because it is running an outdated version of the OS. A policy associated with the service node may dictate that mobile devices including outdated operating systems are not allowed access to a service. Applying the policy to the security posture, it may be determined that the device is not validated for access to the service and the process proceeds to step 940.

In another example, security posture information extracted from a message includes a posture value that indicates that the device is not secure because it includes an unauthorized application. A policy associated with the service node may dictate that mobile devices including unauthorized applications are not validated for access to the service. In this case, access to the service is denied and the process may proceed to step 960.

At 930, the mobile device is provided access to the service.

At 940, it is determined whether a mobile device management server validates the mobile device. In various embodiments, the service node communicates with the device management server to validate the mobile device. In one example communication, the security posture timestamp included in the security posture information received from the mobile device indicates that the security posture information is no longer valid (e.g., has expired). The service node may request updated security posture information from the device management server, and the device management server provides to the service node a current security posture value for the device. In another example, the security posture information received from the device indicates that the device is partially secure because the device password policy does not require enough complexity. In this case, the service node may request information from the device management server to determine whether to validate the device. In the event the device management server validates the mobile device, the process may proceed to step 950. In the event the mobile device management server does not validate the device, the process proceeds to step 960.

At 950, the mobile device is provided access to the service.

At 960, the mobile device and/or applications on the mobile device are denied access to the service. In some embodiments, a notification is sent to the mobile device including a reason that access is denied.

At 970, information is sent to the mobile device including operations to perform to access the service. In various embodiments, the service node sends to the mobile device commands and/or instructions to be performed to secure the device for access to the service. In one example, the security posture information indicates that the device is partially secure because the device is running an old version of the OS. In this case, the service node may send commands for the device to update the operating system. In another example, security posture information indicates that the mobile device is not secure because an unauthorized application is installed. In this case, commands are sent to the device to delete the unauthorized application. In some embodiments, the mobile device performs actions to bring the device into a secure state, and access to the service is allowed when the device is in a secure state.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    registering a service node with a device management server to provide a service;
    negotiating with the device management server regarding a data structure associated with security posture information, wherein the data structure includes a mapping of one or more security postures to corresponding posture values;
    receiving from a mobile device a message that includes the security posture information;
    validating the mobile device based on the security posture information; and
    providing the mobile device with access to the service based at least in part on the validation.

2. The method of claim 1, wherein the one or more security postures includes at least one of a secure posture value, a not secure posture value, a jailbroken security posture value, a rooted security posture value, an unauthorized application installed security posture value, and/or a password policy violation security posture value.

3. The method of claim 1, wherein the mobile device is configure to send to the device management server, state information, wherein the state information is used at the device management server to generate the security posture information.

4. The method of claim 3, wherein the state information includes one or more of mobile device state information, application inventory information, and policy state information.

5. The method of claim 3, wherein the mobile device is configured to send the state information from a management agent on the mobile device to the device management server.

6. The method of claim 3, wherein the device management server is configured to perform the steps of:
    receiving the state information;
    determining a posture of the mobile device at least in part by applying rules to the state information;
    generating the security posture information including a security posture value indicating the security posture of the mobile device; and
    sending the security posture information to the mobile device.

7. The method of claim 1, wherein the mobile device is configured to:
    determine a posture of the mobile device based at least in part on state information; and
    generate the security posture information indicating the posture of the mobile device.

8. The method of claim 7, wherein a management agent on the mobile device is configured to determine the posture and to send the security posture information to a managed application on the mobile device.

9. The method of claim 7, wherein a virtual private network client on the mobile device is configured to determine the posture.

10. The method of claim 9, wherein a managed application of the mobile device embeds the security posture information into the message.

11. The method of claim 1, wherein the mobile device is configured to embed the security posture information into the message.

12. The method of claim 11, wherein the embedding step includes embedding the security posture information into a header of a hypertext transfer protocol (HTTP) message.

13. The method of claim 11, wherein the embedding step includes embedding the security posture information into a Wi-Fi user profile associated with the mobile device.

14. The method of claim 11, wherein the embedding step includes adding the security posture information to a portion of the message, wherein the message includes information to be sent to the service node irrespective of the security posture information.

15. The method of claim 1, wherein the security posture information includes one or more of mobile device posture information, timestamp information, and a service identifier associated with the service node.

16. The method of claim 1, wherein the security posture information includes a first set of security posture information generated at the mobile device and a second set of security posture information generated at a device management server.

17. The method of claim 15, further comprising:
    selecting a set of security posture information based at least in part on timestamp information included in the sets of security posture information; and
    analyzing the selected set of security posture information.

18. The method of claim 1, wherein the security posture information is encrypted at the device management server using encryption information associated with the service node.

19. The method of claim 18, further comprising using the encryption information associated with the service node to extract the security posture information from the message.

20. The method of claim 1, wherein registering the service node with the device management server includes determining one or more of a service identifier associated with the service, encryption information associated with the service node, a communication protocol, one or more security values, and a security posture expiration period.

21. A method, comprising:
    registering a service node with a device management server to provide a service;
    negotiating with the device management server regarding a data structure associated with security posture information, wherein the data structure includes a mapping of one or more security postures to corresponding posture values;
    receiving from a mobile device a message that includes the security posture information;
    analyzing the security posture information;
    validating the mobile device based on the security posture information; and providing the mobile device access to the service based at least in part on the analysis of the security posture information.

22. The method of claim 21, wherein analyzing the security posture information includes:
applying a policy to one or more of a security posture value and a security posture expiration time included in the security posture information;
determining that the mobile device is validated to access the service based at least in part on the application of the policy; and
providing the mobile device access to the service based at least in part on the determination.

23. The method of claim 22, further comprising providing information to the mobile device including operations to be performed to gain access to the service.

24. A method, comprising:
registering a service node with a device management server to provide a service;
negotiating with the device management server regarding a data structure associated with security posture information, wherein the data structure includes a mapping of one or more security postures to corresponding posture values;
receiving from a mobile device a message that includes the security posture information;
analyzing the security posture information;
validating the mobile device based on the security posture information; and
denying the mobile device access to the service based at least in part on the analysis of the security posture information.

25. A system, comprising:
a processor; and
a memory coupled with the processor, wherein the memory is configured to provide the processor with instructions which when executed cause the processor to:
register a service node with a device management server to provide a service;
negotiate with the device management server regarding a data structure associated with security posture information, wherein the data structure includes a mapping of one or more security postures to corresponding posture values;
receive from a mobile device a message that includes the security posture information;
validate the mobile device based on the security posture information; and
provide the mobile device with access to the service based at least in part on the validation.

26. A computer program product, the computer program product being embodied in a tangible non-transitory computer readable storage medium and comprising computer instructions for:
registering a service node with a device management server to provide a service;
negotiating with the device management server regarding a data structure associated with security posture information, wherein the data structure includes a mapping of one or more security postures to corresponding posture values;
receiving from a mobile device a message that includes the security posture information;
validating the mobile device based on the security posture information;
providing the mobile device with access to the service based at least in part on the validation.

* * * * *